United States Patent [19]

Smith

[11] 4,266,360
[45] May 12, 1981

[54] ARTIFICAL BAIT

[76] Inventor: Brian F. Smith, 1132 Chalet Rd., R.R. 1, Sidney, BC, Canada, V8L 3R9

[21] Appl. No.: 48,907

[22] Filed: Jun. 15, 1979

[51] Int. Cl.³ .............................................. A01K 85/00
[52] U.S. Cl. .................................. 43/42.09; 43/42.33; 43/42.48
[58] Field of Search ................ 43/42.09, 42.32, 42.33, 43/42.35, 42.45, 42.48

[56] References Cited

U.S. PATENT DOCUMENTS

| | | | |
|---|---|---|---|
| 1,088,475 | 2/1914 | Stewart | 43/42.09 |
| 2,102,492 | 12/1937 | Stolley | 43/42.48 X |
| 2,112,385 | 3/1938 | Smith | 43/42.35 X |
| 2,510,566 | 6/1950 | Flaherty | 43/42.09 |
| 2,573,592 | 10/1951 | Nickel | 43/42.33 X |
| 2,599,035 | 6/1952 | Wing | 43/42.33 |
| 3,069,801 | 12/1962 | Mills | 43/42.09 X |

FOREIGN PATENT DOCUMENTS 522505  3/1956  Canada .................................... 43/42.33

*Primary Examiner*—Nicholas P. Godici
*Attorney, Agent, or Firm*—Otto John Munz

[57] ABSTRACT

An artificial bait of the type of a hollow, transparent body having a front, blunt portion, wherein the front or head portion of the bait is of a color distinct from that of the rest of the bait. The main body color of the bait is provided by a sheet-like insert in the body extending from the rear end to a point spaced from the end wall of the head portion. The front end wall is preferably concave and is provided with a paint layer, preferably applied to the exterior. Since both the front wall and the rest of the body is moulded from a transparent plastics material, the color of the paint applied to the front wall is also displayed at the side wall of the body. Accordingly, the color of the front portion, preferably red, is visible not only in front view but also at virtually any angle of viewing of the bait, except the exact rear view. The combination of an insert that is shorter then the entire length of the interior of the bait facilaties the assembly of the bait, while application of the paint only in a concave, blunt front wall further reduces the manufacturing cost. The concave shape of the front surface of the head portion of the bait protects the exterior paint layer from extreme wear.

5 Claims, 3 Drawing Figures

U.S. Patent    May 12, 1981    4,266,360
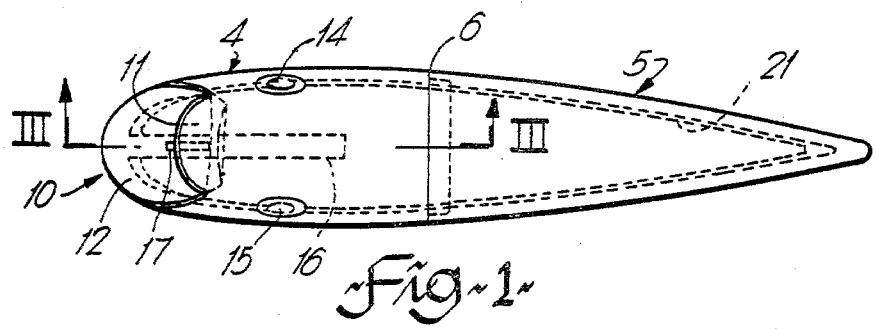
Fig-1-
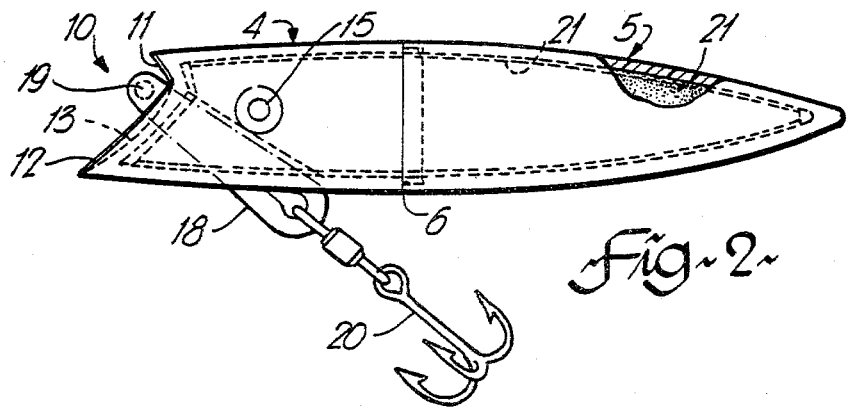
Fig-2-
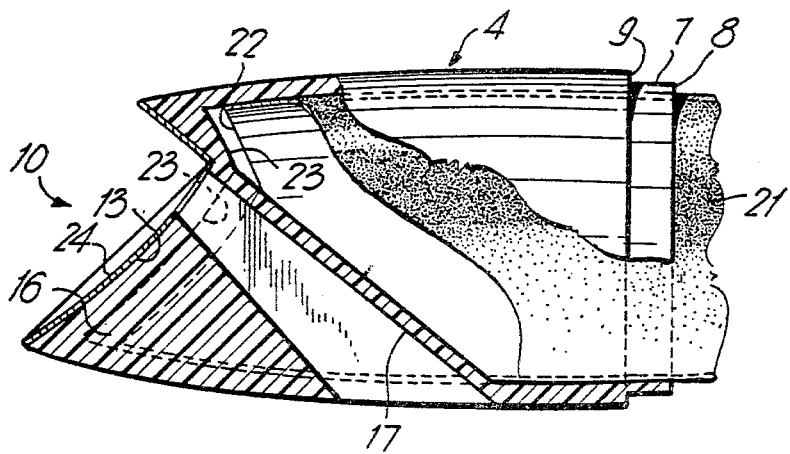
Fig-3-

ARTIFICAL BAIT

The present invention relates to artificial bait of the type moulded from a transparent plastics material and containing a coloured insert disposed within the body to protect the insert from mechanical damage. The bait of the type to which the present invention relates is further typical by a distinct colour in the front or head portion of the bait.

In another aspect, the present invention may also be defined as relating to a trolling plug of the type of a generally projectile-shaped body having a front end portion and a pointed rear end portion, the front end portion being generally blunt and displaying a colour distinct from the rest of the body of the plug.

The advantage of utilizing in the art of artificial baits plastics material such as polyvinyl chloride or the like is well known to reduce costs as such materials are capable of moulding thus considerably lowering the manufacturing cost compared with, say, metallic baits. It has also been recognized that the advantage of transparent trolling plugs or the like is in that a coloured insert, usually in the form of a sheet, whether in planar configuration spanning the entire diameter of the plug, or in the form of a sheet disposed about the interior surface of the plug, is of a particular advantage since the sheet is protected from mechanical and chemical effects to which the plug is normally suggested when in use. It is also recognized that to certain fish, for instance salmon, are particularly attracted by a bait whose body displays a silvery or shiny colour, while the front or mouth portion displays a colour considerably different from the colour of the body, usually red. The last mentioned type of the artificial bait or trolling plug is the one to which the present invention relates.

Attempts have long been made to produce the above type of trolling plugs by utilizing a transparent, hollow body made from plastics material. Reference may be had for instance to U.S. Pat. No. 1,088,475 issued to C. W. Stewart, which discloses an artificial bait having a covering composed of succeeding layers, each simulating a different fish either as to form or colour or both. If desired, the character of the representations may be further varied by exposing a head and a body of different colours. The disadvantage of this reference is obvious; it is exposed to the environment of the bait and as such has a relatively limited lifetime. U.S. Pat. No. 2,112,385 issued to H. F. Smith discloses a transparent lure having an accessible interior in which coloured artificial bait inserts may be placed, whereby the colour aspect of the lure can be altered at will by the use. For the purpose, Smith proposes, for instance, one insert for the body and another insert for the head. The inserts are preferably shaped to fit within the bait chamber and the interior of the head. A fisherman may have a number of differently coloured body and head inserts which he can place in the lure in such colour combinations as he finds most effective. The transparent material of which the lure is made renders the bait visible to game fish and protects it against loss of mutilation when a fish strikes. The drawback from the standpoint of the present invention is in that while recognizing the ease with which a colour insert may be included in a bait, the arrangement is relatively expensive since two different inserts have to be produced. Furthermore, since the entire length of the bait is covered by the insert, the insert has to be produced and mounted in a relatively accurate fashion.

U.S. Pat. No. 2,309,521 issued to R. A. Mabee discloses a plug bait of the type containing a material arranged to provide a number of reflecting surfaces visible through the transparent portion and presenting a highly attractive appearance when the bait is in its action in the water. The interior of the bait may be filled with crumpled cellophane or some equivalent economical material of any desired colour or colours. To achieve the effect of two distinct colours in front and in the back of the lure, Mabee proposes the head portion from an opaque material, while the body is preferably substantially transparent. While there is little doubt that the proposed solution provides an attractive bait, its production is relatively expensive since two different materials had to be used for the plug body itself (transparent main portion of the body plus opaque front portion).

Finally, U.S. Pat. No. 3,408,764 to J. E. McCurry teaches the use of inserts in a transparent lure body which is supposedly "simple of design and rugged of construction". Inserts are located in slots disposed within the body of the lure. The overall arrangement not only makes the moulding of the transparent body expensive but also appears likely to make the replacement of different inserts very cumbersome.

It is an object of the present invention to provide the aforesaid type of lure which would be not only relatively inexpensive to produce but would also provide particular effect, namely visibility of the distinct colour of the lure from side view and from virtually any angle with the exception of generally direct rear view in which the entire front portion of the lure is obstructed by the central portion of the lure.

In general terms, the present invention provides artificial bait of the type having an elongate, hollow, generally transparent body portion including side wall means and a generally blunt front end wall portion; coloured insert received within said body to provide same with desired first color means, said insert having a front edge portion spaced from said front end wall portion, whereby a front part of said side wall means adjacent to said front end wall portion is transparent and generally free of any color; said front end wall portion being provided with second colour means distinct from said first color means and applied only to said front end wall portion such as to be visible at both surfaces of said front end wall portion. Preferably, the second colour means is applied only to exterior surface of said front end wall means. It is further preferred that the second colour means be a layer of paint, to facilitate application thereof. At least the exterior surface of said front end wall is preferably concavely curved, whereby a portion of said second colour means is displayed and visible through said front part of said side wall means when viewed in said view and/or in end view.

In another aspect, the present invention provides a trolling plug of the type of a generally projectile-shaped body having a front end portion and a pointed rear end portion, said front portion and said end portion being each of the type of a hollow container made from a transparent material and being fixedly secured to each other along a peripheral waterproof joinder, said front end portion being blunted by a notch including a relatively large, slightly concavely depressed surface portion extending downwardly and backwardly relative to the elongation of the body, and a relatively small surface portion disposed at an angle to the former and extending downwardly and forwardly relative to the elongation of the body, whereby the notch generally resembles fish mouth; attachment means for securing said body to a line and for securing hook means to said plug; colour means of the type making the plug display at least two distinct colours of which one distinct colour is displayed at the front end portion, the other distinct colour being displayed over major portion of the body to imitate surface colour or colours of a fish species, wherein said one distinct colour is formed by a paint layer applied to the surface of said notch, said other distinct colour being formed by a sheet-like insert disposed inside the plug and generally coincident with inside wall thereof, said insert terminating near the front end at a spacing from the notch to provide a narrow, transparent, peripheral section adjacent the notch, said transparent section rendering said one distinct colour visible from virtually any angle of viewing the plug.

The invention will now be described by way of preferred embodiments, with reference to the accompanying drawing, it being understood that many features referred to hereinafter may be omitted or changed without departing from the scope of the present invention.

In the drawing:

FIG. 1 is a top view of a trolling plug body incorporating features of the present invention, certain portions of the plug, namely the hook and eyelet hardware, being omitted for the sake of clarity.

FIG. 2 is a side view of the plug shown in FIG. 1, inclusive the hook and eyelet hardware; and FIG. 3 is partially sectional view of the front portion of FIG. 1, along the line III—III, on enlarged scale.

The trolling plug shown in the drawing consists of a front or head portion 4 of a generally circular cross-sectional configuration, and a pointed rear portion 5, both head and rear portions 4, 5 being connected with each other at a circumferential joinder 6, of the type formed by a cylindric part 7 on the head portion 4, by a rear face 8 of the head portion and by a front shoulder 9, as seen in FIG. 3. It will be appreciated on comparing FIG. 3 with FIG. 2 that the rear portion 5 has counterparts to the details 7, 8, 9 as referred to above for a snug fit and for an adhesive securement of the head and rear portions 4, 5 to each other by ultrasonic welding.

In general terms, it will be appreciated that the front and rear portions are each of the type of a hollow container. The portions are made by moulding from a transparent polycarbonate. The front end 10 of the head portion 4 is blunted and displays, in the embodiment shown, a generally V-shaped notch comprised of a relatively small, planar, upper surface 11 and a slightly concave, relatively large, lower surface 12. The concave feature of the lower surface 12 can best be appreciated from FIGS. 2 and 3, with reference to the bottom line 13 which represents the shape of the lower surface 12 approximately along the section line III—III in FIG. 1.

Reference numerals 14 and 15 represent each two concentric depressions simulating the eye of a fish. The inside circle of each of depressions 14, 15 may be coloured in black while the outside circle or annulus is painted in yellow. The concentric depressions 14, 15 are omitted from FIG. 3 to indicate that an embodiment which does not have the eye simulating depressions also falls within the scope of the present invention. In such case, it is preferred that eye simulatious be included in a printed reflective sheet as referred to hereinafter. A reinforcement rib 16 extends generally centrally of the head portion 4 and defines therein a wedge-shaped groove or recess 17 for receiving a complementary link 18 whose front portion defines an eyelet 19, while the rear end thereof is provided with a hook 20. The arrangement of elements 18, 19 and 20 within a wedge-shaped recess 17 is well known in the art and need not be described in greater detail.

Disposed within the chambers defined by the head and rear portion 4, 5 is a reflective sheet 21 disposed around the interior wall of the respective chambers. Since the body of the plug is transparent, the colour of the reflective sheet 21 is visible from exterior. The reflective sheet reaches generally up to the pointed end (right hand side) of the rear portion 5, while the front edge 22 (FIG. 3) of the sheet 21 is spaced from the front wall 23 of the head portion 4. The front wall 23 is generally complementary with the shape of the surfaces 11, 12, as referred to above. Thus, there is a circumferential free space left between the front edge 22 of the reflective sheet 21 and the front wall 23 of the head portion.

The exterior of the V-shaped notch is provided with a red paint layer 24 (FIG. 3). It will be readily appreciated that the paint layer 24 is visible not only in a front view, but also visible in side view, since the red colour shows through the transparent material of the front wall 23 and then through the peripheral slot between the front edge 22 of the reflective sheet 21 and the front wall 23 of the head portion 4. Thus, a single layer 24 of paint provides the plug with an attracting feature visible even when viewed from an angle at which the surface of the paint is not directly viewed.

The type of material and of the paint to be used in connection with the present invention is readily conceivable by those skilled in the art. In the embodiment described above, the paint was a red acrylic lacquer. Those skilled in the art will also appreciate that the reflective sheet 21 may have a plurality of colours to imitate the colours of the surface of a fish. As mentioned above, it also may include the eye simulatious thus avoiding the need for the aforesaid depressions 14, 15, to further reduce production costs. Similarly, the paint layer 24 even though normally a single colour, preferably red, may be comprised of two or more colours without departing from the scope of the present invention. Therefore, the respective colours are referred to as "colour means" to indicate that more than one colour may be involved in either of the two coloured portions of the plug. Similarly, it is to be appreciated that the shape of the plug per se is known in the art and may be substituted by many different shapes; such different shapes and many other modifications departing from the preferred embodiment as described above, however, do not depart from the scope of the present invention as recited in the accompanying claims.

The embodiments of the invention is which an exclusive property or privilege is claimed are defined as follows:

1. Artificial bait of the type having an elongate, hollow, generally transparent body portion including transparent side wall means and a generally blunt transparent front end wall portion having an exterior and an interior surface; a coloured insert received within said body to provide same with a desired first colour means, said insert having a front edge portion spaced from said front end wall portion, whereby a front part of said side wall means adjacent to said front end wall portion is uncolored by said insert, said front end wall portion being provided with second colour means distinct from said first color means and applied only to said front end wall portion, said second color means being visible through said front part of said side wall means.

2. Artificial bait as claimed in claim 1, wherein the second colour means is applied only to said exterior surface of said front end wall portion.

3. Artificial bait as claimed in claim 2, wherein said second colour means is a layer of paint.

4. Artificial bait as claimed in claim 1, 2 or 3, wherein at least the exterior surface of said front end wall is concavely curved, whereby a portion of said second colour means is displayed and visible through said front part of said side wall means.

5. A trolling plug of the type of a generally projectile-shaped body having a front end portion and a pointed rear end portion, said front end portion and said rear end portion being each of the type of a hollow container made from a transparent material and being fixedly secured to each other along a peripheral water proof joinder, said front end portion being blunted by a notch including a relatively large, slightly concavely depressed surface portion extending downwardly and forwardly relative to the elongation of the body, and a relatively small surface portion disposed at an angle to the former and extending downwardly and backwardly relative to the elongation of the body, whereby the notch generally resembles a fish mouth; attachment means for securing said body to a line and for securing hook means to said plug; colour means of the type making the plug display at least two distinct colours of which one distinct colour is displayed at the front end portion, and other distinct colour being displayed over a major surface portion of the body to imitate surface colour or colours of a fish species; wherein said one distict colour is formed by a paint layer applied to the surface of said notch, said other distinct colour being formed by a sheet-like insert disposed inside the plug and generally coincident with inside wall thereof, said insert terminating at the front end portion at a spacing from the notch to provide a narrow, transparent, peripheral section adjacent the notch.

* * * * *